United States Patent
Bennah et al.

(10) Patent No.: US 9,489,186 B2
(45) Date of Patent: *Nov. 8, 2016

(54) DYNAMICALLY RECOMMENDING CONFIGURATION CHANGES TO AN OPERATING SYSTEM IMAGE

(71) Applicant: INTERNATIONAL BUSINESS MACHINES CORPORATION, Armonk, NY (US)

(72) Inventors: Albert D. Bennah, Cary, NC (US); Adrian X. Rodriguez, Durham, NC (US); Eric Woods, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 54 days.

This patent is subject to a terminal disclaimer.

(21) Appl. No.: 13/659,316

(22) Filed: Oct. 24, 2012

(65) Prior Publication Data
US 2014/0101431 A1    Apr. 10, 2014

Related U.S. Application Data

(63) Continuation of application No. 13/646,020, filed on Oct. 5, 2012.

(51) Int. Cl.
*G06F 9/44*     (2006.01)
*G06F 9/445*    (2006.01)

(52) U.S. Cl.
CPC ..................... *G06F 8/63* (2013.01)

(58) Field of Classification Search
CPC ............ G06F 2009/45562; G06F 2009/4557; G06F 2009/45579; G06F 2009/45587; G06F 2009/45591; G06F 21/10; G06F 21/305; G06F 21/51; G06F 21/53; G06F 21/56; G06F 21/62; G06F 8/63; G06F 8/71
USPC ................................. 717/120, 121, 127, 168
See application file for complete search history.

(56) References Cited

U.S. PATENT DOCUMENTS 6,272,626 B1    8/2001  Cobbett
6,330,715 B1   12/2001  Razzaghe-Ashrafi
(Continued)

FOREIGN PATENT DOCUMENTS

WO    WO 2012/048030 A2    4/2012

OTHER PUBLICATIONS

OAsysadmin, "Copying, moving and replicating the MDT 2010 deployment share", Nov. 2011, pp. 1-9, oasysadmin.com (online), URL: oasysadmin.com/2011/11/03/copying-moving-and-replicating-the-mdt-2010-deployment-share/.

(Continued)

*Primary Examiner* — Anna Deng
(74) *Attorney, Agent, or Firm* — Brandon C. Kennedy; Grant A. Johnson; Kennedy Lenart Spraggins LLP (57) ABSTRACT

Methods, apparatuses, and computer program products for dynamically recommending configuration changes to an operating system image are provided. Embodiments include monitoring, by an image deployment monitor, configurations of a plurality of deployed copies of a master operating system (OS) image; detecting, by the image deployment monitor, a change in one or more configurations of a first set of deployed copies of the plurality of deployed copies; and in response to detecting the change, generating, by the image deployment monitor, a configuration recommendation to recommend the change to an OS image.

5 Claims, 3 Drawing Sheets

(56) References Cited

U.S. PATENT DOCUMENTS

| | | |
|---|---|---|
| 6,513,115 B2 | 1/2003 | Nock et al. |
| 7,240,107 B2 | 7/2007 | Chase-Salerno |
| 7,600,216 B2 | 10/2009 | Shlomai |
| 7,694,280 B2 | 4/2010 | James et al. |
| 7,757,214 B1 | 7/2010 | Palczak et al. |
| 7,802,246 B1 | 9/2010 | Kennedy et al. |
| 7,890,951 B2 | 2/2011 | Vinberg |
| 8,117,168 B1 | 2/2012 | Stringham |
| 8,181,174 B2 | 5/2012 | Liu |
| 8,219,983 B1 | 7/2012 | Sobel et al. |
| 8,239,509 B2 | 8/2012 | Ferris et al. |
| 8,296,251 B1 | 10/2012 | Athayde |
| 8,347,280 B2 | 1/2013 | Swarna |
| 8,352,608 B1 | 1/2013 | Keagy et al. |
| 8,381,191 B2 | 2/2013 | Mondal |
| 8,423,958 B2 | 4/2013 | Velupillai |
| 8,429,630 B2 | 4/2013 | Nickolov |
| 8,468,518 B2 | 6/2013 | Wipfel |
| 8,612,566 B2 | 12/2013 | Ferris et al. |
| 8,627,293 B2 | 1/2014 | Perrone et al. |
| 8,635,686 B2 | 1/2014 | Sriram |
| 8,869,135 B1 | 10/2014 | Fitzgerald et al. |
| 8,990,772 B2 | 3/2015 | Bennah |
| 8,990,796 B2 | 3/2015 | Lamantia |
| 2002/0124245 A1 | 9/2002 | Maddux |
| 2003/0051128 A1 | 3/2003 | Rodriguez et al. |
| 2004/0025154 A1 | 2/2004 | Sedlack |
| 2004/0153478 A1 | 8/2004 | Igouchkine |
| 2004/0162876 A1 | 8/2004 | Kohavi |
| 2004/0181776 A1 | 9/2004 | Atkin et al. |
| 2004/0230731 A1 | 11/2004 | Arimilli et al. |
| 2005/0235352 A1 | 10/2005 | Staats et al. |
| 2006/0037016 A1 | 2/2006 | Saha |
| 2006/0161895 A1 | 7/2006 | Speeter et al. |
| 2006/0184937 A1 | 8/2006 | Abels et al. |
| 2006/0248139 A1 | 11/2006 | Sundar |
| 2006/0248513 A1 | 11/2006 | Foster et al. |
| 2007/0180509 A1 | 8/2007 | Swartz et al. |
| 2007/0226358 A1 | 9/2007 | Krywaniuk |
| 2007/0240151 A1* | 10/2007 | Marl ........................ G06F 8/61 717/174 |
| 2007/0283324 A1 | 12/2007 | Geisinger |
| 2007/0283329 A1 | 12/2007 | Caprihan et al. |
| 2008/0052675 A1 | 2/2008 | Wookey |
| 2008/0098379 A1 | 4/2008 | Newman et al. |
| 2008/0104573 A1 | 5/2008 | Singla et al. |
| 2008/0141010 A1 | 6/2008 | Crowell et al. |
| 2008/0141217 A1 | 6/2008 | Goetz et al. |
| 2008/0155534 A1 | 6/2008 | Boss et al. |
| 2008/0184200 A1 | 7/2008 | Burns et al. |
| 2009/0016220 A1 | 1/2009 | Uysal et al. |
| 2009/0019438 A1 | 1/2009 | Madduri et al. |
| 2009/0019535 A1 | 1/2009 | Mishra et al. |
| 2009/0037680 A1 | 2/2009 | Colbert et al. |
| 2009/0048993 A1 | 2/2009 | Lohrbach et al. |
| 2009/0089624 A1 | 4/2009 | Austen et al. |
| 2009/0100420 A1 | 4/2009 | Sapuntzakis et al. |
| 2009/0118839 A1 | 5/2009 | Accapadi et al. |
| 2009/0228868 A1 | 9/2009 | Drukman et al. |
| 2009/0265707 A1 | 10/2009 | Goodman et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300607 A1 | 12/2009 | Ferris et al. |
| 2009/0300641 A1 | 12/2009 | Friedman et al. |
| 2009/0300707 A1 | 12/2009 | Garimella et al. |
| 2010/0037207 A1 | 2/2010 | Chambers et al. |
| 2010/0153443 A1 | 6/2010 | Gaffga et al. |
| 2010/0192143 A1 | 7/2010 | Ingle et al. |
| 2010/0229175 A1 | 9/2010 | Gonzalez et al. |
| 2010/0257523 A1* | 10/2010 | Frank ........................ 718/1 |
| 2010/0274890 A1 | 10/2010 | Patel et al. |
| 2010/0325410 A1* | 12/2010 | Fitzgerald et al. ........ 713/2 |
| 2010/0332637 A1 | 12/2010 | Doi et al. |
| 2010/0332890 A1* | 12/2010 | Chen et al. ............... 714/2 |
| 2011/0016414 A1 | 1/2011 | Ernst et al. |
| 2011/0126168 A1 | 5/2011 | Ilyayev |
| 2011/0131301 A1 | 6/2011 | Klein et al. |
| 2011/0145789 A1 | 6/2011 | Rasch et al. |
| 2011/0154320 A1 | 6/2011 | Verma |
| 2011/0161952 A1 | 6/2011 | Poddar et al. |
| 2011/0173605 A1* | 7/2011 | Bourne ........................ 717/176 |
| 2012/0030459 A1 | 2/2012 | Aldridge et al. |
| 2012/0030672 A1 | 2/2012 | Zygmuntowicz et al. |
| 2012/0054868 A1 | 3/2012 | Ramalingam |
| 2012/0079474 A1* | 3/2012 | Gold et al. .................... 717/173 |
| 2012/0084414 A1 | 4/2012 | Brock et al. |
| 2012/0084752 A1 | 4/2012 | Arnold et al. |
| 2012/0102160 A1 | 4/2012 | Breh et al. |
| 2012/0102481 A1 | 4/2012 | Mani et al. |
| 2012/0131577 A1 | 5/2012 | Arcese et al. |
| 2012/0159471 A1 | 6/2012 | de Souza et al. |
| 2012/0167048 A1 | 6/2012 | Walsh et al. |
| 2012/0246619 A1 | 9/2012 | Thirumalai et al. |
| 2012/0278797 A1 | 11/2012 | Secrist et al. |
| 2012/0284405 A1 | 11/2012 | Ferris et al. |
| 2013/0067049 A1 | 3/2013 | Ghosh et al. |
| 2013/0080619 A1* | 3/2013 | Assuncao et al. ............ 709/224 |
| 2013/0080997 A1 | 3/2013 | Dattathreya |
| 2013/0125107 A1* | 5/2013 | Bandakka et al. ............ 717/171 |
| 2013/0138718 A1 | 5/2013 | Mallur et al. |
| 2013/0332921 A1 | 12/2013 | Khutornenko et al. |
| 2014/0033188 A1* | 1/2014 | Beavers et al. ............... 717/170 |
| 2014/0033189 A1* | 1/2014 | Buswell ....................... 717/170 |
| 2014/0040438 A1 | 2/2014 | Donahue et al. |
| 2014/0052683 A1* | 2/2014 | Kirkham et al. ............... 706/46 |
| 2014/0075172 A1 | 3/2014 | Knichel et al. |
| 2014/0101421 A1 | 4/2014 | Bennah et al. |
| 2014/0101422 A1 | 4/2014 | Bennah et al. |
| 2014/0101428 A1 | 4/2014 | Bennah et al. |
| 2014/0101429 A1 | 4/2014 | Bennah et al. |
| 2014/0101430 A1 | 4/2014 | Bennah et al. |
| 2014/0108774 A1 | 4/2014 | Bennah et al. |
| 2014/0108779 A1 | 4/2014 | Bennah et al. |
| 2014/0108951 A1* | 4/2014 | Dharawat et al. ............ 715/747 |
| 2014/0157056 A1 | 6/2014 | Bennah et al. |
| 2014/0259009 A1 | 9/2014 | Bhattiprolu |
| 2015/0309791 A1 | 10/2015 | Bennah et al. |

OTHER PUBLICATIONS

Bell et al., "Configuration Description, Deployment, and Lifecycle Management (CDDLM) Foundation Document", GFD.50, Aug. 2005, 37 pages, Global Grid Forum (online), URL: www.ogf.org/documents/GFD.50.pdf.

Rasmussen et al., "Managing WebSphere DataPower Device configurations for high availability, consistency, and control, Part 2: Application promotion strategies", IBM developerWorks, WebSphere Technical Library, Apr. 2009, 15 pages, IBM developerWorks (online), URL: www.ibm.com/developerworks/websphere/library/techarticles/0904_rasmussen/0904_rasmussen.html.

Office Action, U.S. Appl. No. 13/645,808, Jul. 24, 2014.
Office Action, U.S. Appl. No. 13/646,020, May 23, 2014.
Office Action, U.S. Appl. No. 13/653,090, May 30, 2014.
Office Action, U.S. Appl. No. 13/658,937, May 21, 2014.

Choi, H., et al., "Autonomous Learning for Efficient Resource Utilization of Dynamic VM Migration", ICS'08, Jun. 2008, pp. 185-194, ACM, USA.

Venners, B., "Inside the Java Virtual Machine", Chapter 5 of Inside the Java Virtual Machine, www.artima.com (online), [accessed Jul. 6, 2012], 1-53 pp., URL: http://www.artima.com/insidejvm/ed2/jvmP.html.

Hudson, "Hyper-V Virtual Machine (VM) Parent-Child Configuration Using Differencing Disks", Microsoft TechNet Article, Sep. 2010, [accessed Aug. 7, 2012], 2 pp., URL: http://social.technet.microsoft.com/wiki/contents/articles/1393.hyper-v-virtual-machine-vm-parent-child-configuration-using-differencing-disks.aspx.

"vsphere 5: Updating/Installing profile or vib using esxcli", virtualvm.info (online), May 2012, [accessed Aug. 7, 2012], 3 pp., URL: http://virtualvm.info/?p=170.

(56) References Cited

OTHER PUBLICATIONS

Makris et al., "Dynamic and Adaptive Updates of Non-Quiescent Subsystems in Commodity Operating System Kernels", Proceedings of the 2nd ACM SIGOPS/EuroSys European Conference on Computer Systems (EuroSys'07), vol. 41, Issue 3, Jun. 2007, pp. 327-340, ACM New York, NY, USA.

Chieu et al., "Virtual Machines with Sharable Operating System", Proceedings of the ACM International Conference Companion on Object Oriented Programming Systems Languages and Applications Companion (OOPSLA'11), Oct. 2011, pp. 109-114, 5 pages, ACM New York, NY, USA.

White, "How to Deploy Entire Systems in Mac OS X 10.5", chapter from Apple Training Series: Mac OS X Deployment v10.5, peachpit.com (online), Aug. 20, 2008, pp. 1-9, Pearson Education, Peachpit Press, San Francisco, CA, USA.

Wentzlaff et al., "An Operating System for Multicore and Clouds: Mechanisms and Implementation", Proceedings of the 1st ACM Symposium on Cloud Computing (SoCC'10), Jun. 2010, pp. 1-10, ACM New York, NY, USA.

Scarfone et al., "Guide to Security for Full Virtualization Technologies", Jan. 2011, 35 pages, National Institute of Standards and Technology, Gaithersburg, MD, USA.

Zhang et al., "CCOA: Cloud Computing Open Architecture", IEEE International Conference on Web Services (ICWS), Jul. 2009, pp. 607-616, IEEE Xplore Digital Library (online), DOI: 10.1109/ICWS.2009.144.

Waldspurger, "Memory Resource Management in VMware ESX Server", ACM SIGOPS Operating Systems Review—OSDI'02: Proceedings of the 5th symposium on Operating systems design and implementation, Dec. 2002, pp. 181-94, vol. 36, Issue SI, ACM New York NY, DOI: 10.1145/844128.844146.

Badger et al., "Draft Cloud Computing Synopsis and Recommendations", National Institute of Standards and Technology (NIST) special publication 800-146, May 2012, 84 pages, nist.gov (online), URL: http://citeseerx.ist.psu.edu/viewdoc/download?doi=10.1.1.232.3178&rep=rep1&type=pdf.

* cited by examiner

DYNAMICALLY RECOMMENDING CONFIGURATION CHANGES TO AN OPERATING SYSTEM IMAGE

CROSS-REFERENCE TO RELATED APPLICATION

This application is a continuation application of and claims priority from U.S. patent application Ser. No. 13/646,020, filed on Oct. 5, 2012.

BACKGROUND OF THE INVENTION

1. Field of the Invention

The field of the invention is data processing, or, more specifically, methods, apparatuses, and computer program products for dynamically recommending configuration changes to an operating system image.

2. Description of Related Art

In modern data centers, system administrators often maintain a collection of master operating system (OS) images that are reserved for deployment unto new systems as these systems become operational. A master OS image is a boot device image that includes a representation of a computer program and its related data such as a kernel, file system, configuration, and libraries at a particular given point in time. Deploying copies of a single master OS image is sometimes an efficient way to get multiple systems operational quickly. If a user of the deployed copy has to spend time changing the configuration of the deployed copy, however, the usefulness and efficiency of deployment from the master OS image is diminished.

SUMMARY OF THE INVENTION

Methods, apparatuses, and computer program products for dynamically recommending configuration changes to an operating system image are provided. Embodiments include monitoring, by an image deployment monitor, configurations of a plurality of deployed copies of a master operating system (OS) image; detecting, by the image deployment monitor, a change in one or more configurations of a first set of deployed copies of the plurality of deployed copies; and in response to detecting the change, generating, by the image deployment monitor, a configuration recommendation to recommend the change to an OS image.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary methods, apparatuses, and computer program products for dynamically recommending configuration changes to an operating system image in accordance with the present invention are described with reference to the accompanying drawings, beginning with FIG. 1. Dynamically recommending configuration changes to an operating system image in accordance with the present invention is generally implemented with computers, that is, with automated computing machinery. For further explanation, therefore, FIG. 1 sets forth a block diagram of automated computing machinery comprising an exemplary management server (152) useful in dynamically recommending configuration changes to an operating system image according to embodiments of the present invention. The management server (152) of FIG. 1 includes at least one computer processor (156) or 'CPU' as well as random access memory (168) ('RAM') which is connected through a high speed memory bus (166) and bus adapter (158) to processor (156) and to other components of the management server (152).

Stored in RAM (168) is an image deployment monitor (199) that includes computer program instructions for dynamically recommending configuration changes to an operating system image according to embodiments of the present invention. Specifically, the image deployment monitor (199) includes computer program instructions that when executed by the computer processor (156) cause the image deployment monitor (199) to carry out the step of monitoring configurations of a plurality of deployed copies of a master operating system (OS) image. In the example of FIG. 1, the master OS image (194) is stored in a repository (189) and copies (192, 192) of the master OS image (194) are deployed on client systems (182).

The image deployment monitor (199) also includes computer program instructions that when executed by the computer processor (156) cause the image deployment monitor (199) to carry out the step of detecting a change in one or more configurations of a first set of deployed copies of the plurality of deployed copies of the master OS image (194). A configuration of a deployed copy may include listings of installed software modules and preferences related to the installed software modules. Examples of a change in a configuration include installation of a particular software module after deployment or modification of a preference setting of the deployed copy after deployment.

The image deployment monitor (199) also includes computer program instructions that when executed by the computer processor (156) cause the image deployment monitor (199) to carry out the steps of generating in response to detecting the change, a configuration recommendation to recommend the change to an operating system image. The image deployment monitor (199) may also be configured to provide the configuration recommendation to the master OS image (194) and one or more other deployed copies (192) of the master OS image (194).

By using a configuration recommendation to recommend a configuration change detected in a deployed copy of a master OS image (194), to the master OS image and other concurrently deployed copies of the master OS image, the image deployment monitor (199) may dynamically recommend changes to operating system images. In response to receiving a configuration recommendation, an OS image may make configuration changes in accordance with the configuration recommendation without user action, thus saving a user time and making the configuration of the OS image more relevant and useful to the user.

Also stored in RAM (168) is an operating system (154). Operating systems useful dynamically recommending configuration changes to an operating system image according to embodiments of the present invention include UNIX™, Linux™, Microsoft XP™, AIX™, IBM's i5/OS™, and others as will occur to those of skill in the art. The operating system (154) and the image deployment monitor (199) in the example of FIG. 1 are shown in RAM (168), but many components of such software typically are stored in non-volatile memory also, such as, for example, on a disk drive (170).

Figure 1:
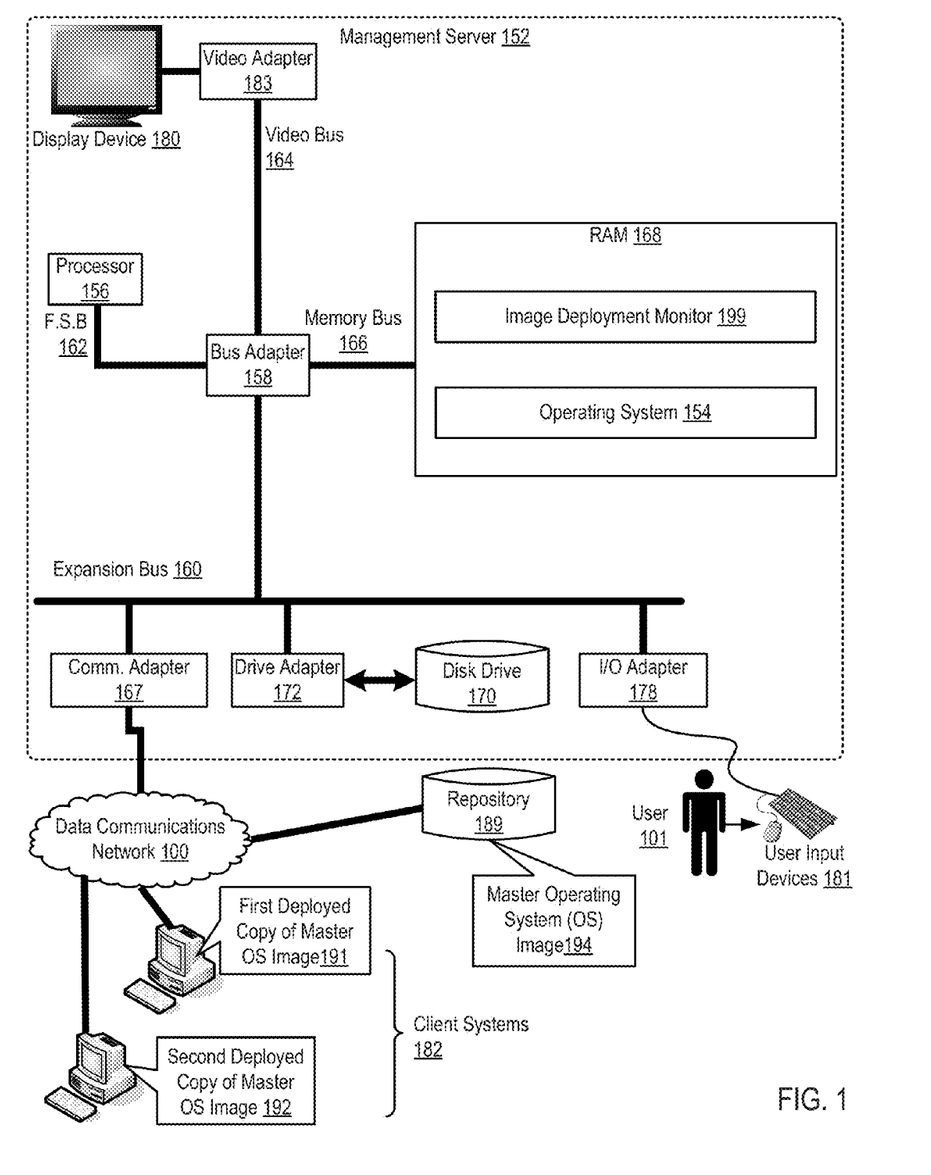
FIG. 1 sets forth a block diagram of automated computing machinery comprising an exemplary management server useful in dynamically recommending configuration changes to an operating system image according to embodiments of the present invention.

The management server (152) of FIG. 1 includes disk drive adapter (172) coupled through expansion bus (160) and bus adapter (158) to processor (156) and other components of the management server (152). Disk drive adapter (172) connects non-volatile data storage to the management server (152) in the form of disk drive (170). Disk drive adapters useful in computers for dynamically recommending configuration changes to an operating system image according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example management server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example management server (152) of FIG. 1 includes a video adapter (183), which is an example of an I/O adapter specially designed for graphic output to a display device (180) such as a display screen or computer monitor. Video adapter (183) is connected to processor (156) through a high speed video bus (164), bus adapter (158), and the front side bus (162), which is also a high speed bus.

The exemplary management server (152) of FIG. 1 includes a communications adapter (167) for data communications with the repository (189) and other computers, such as client computers (182) via a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for dynamically recommending configuration changes to an operating system image according to embodiments of the present invention include modems for wired dial-up communications, Ethernet (IEEE 802.3) adapters for wired data communications network communications, and 802.11 adapters for wireless data communications network communications.

Figure 2:
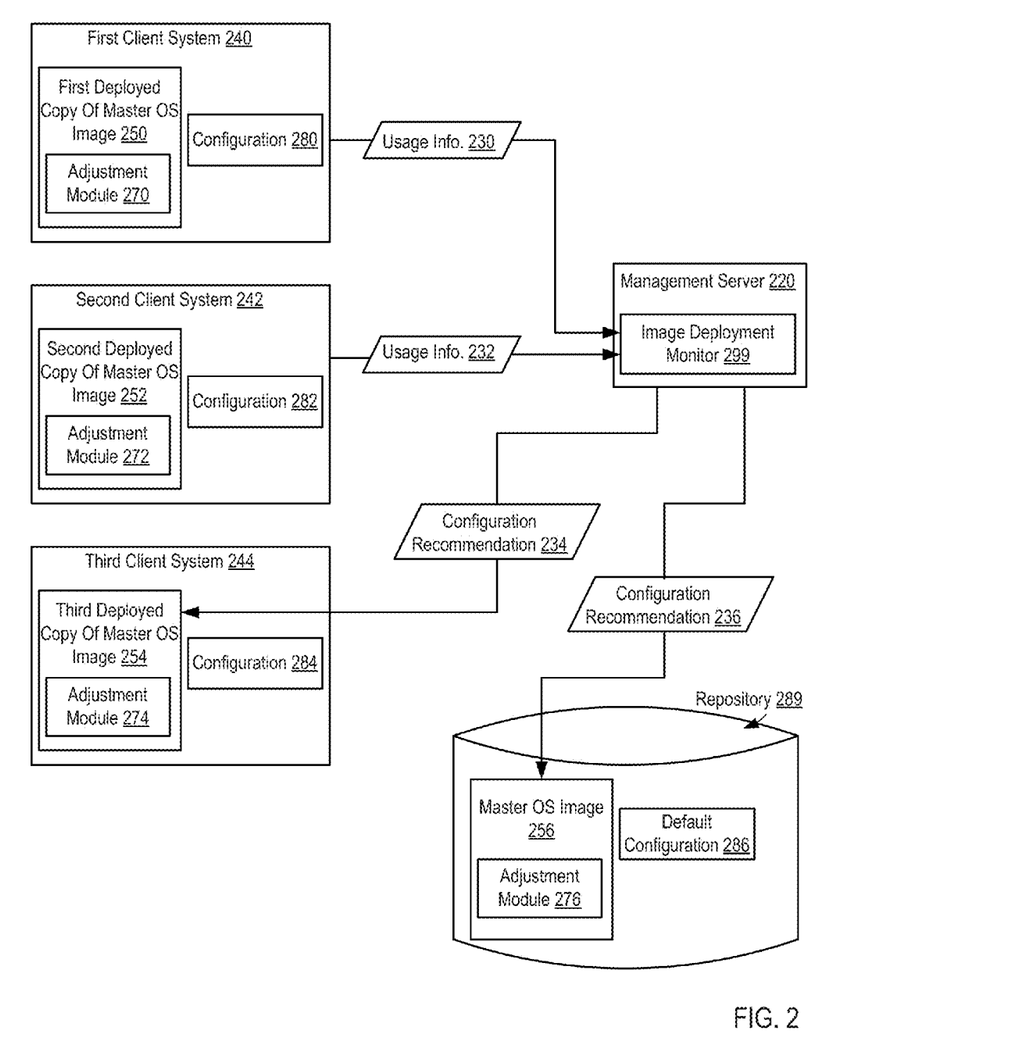
FIG. 2 sets forth a block diagram of a system comprising another example management server useful in dynamically recommending configuration changes to an operating system image according to embodiments of the present invention.

For further explanation, therefore, FIG. 2 sets forth a block diagram of a system comprising another example management server useful in dynamically recommending configuration changes to an operating system image according to embodiments of the present invention.

The system of FIG. 2 includes a management server (220) with an image deployment monitor (299) configured to monitor concurrently deployed copies of a master OS image (256) that is stored in a master OS image repository (289). In the example of FIG. 2, the image deployment monitor (299) monitors a first deployed copy (250) deployed upon a first client system (240), a second deployed copy (252) on a second client system (242), and a third deployed copy (254) on a third client system (244). In the example of FIG. 2, only three deployed copies of a single master OS image are illustrated but the image deployment monitor (299) may be configured to monitor any number of deployed copies of any number of master OS images.

As part of monitoring concurrently deployed copies, the image deployment monitor (299) may receive usage information. Usage information is data indicating changes that a user makes to a default configuration after a copy is deployed on a client system. An example of usage information includes indications of software modules installed after deployment and that were not part of the default configuration. User preferences associated with the deployed copy may also be indicated in usage information. In the example of FIG. 2, the image deployment monitor (299) receives first usage information (230) from the first deployed copy (250) and second usage information (232) from the second deployed copy (252).

In a particular embodiment, a monitoring agent may be installed at a client system to collect usage information and transmit the collected usage information to an image deployment monitor. A monitoring agent may be a software application that inspects the configuration of a deployed copy to detect changes to the default configuration of the deployed copy, such as user installation of new software modules and user changes to preferences of the deployed copy and transmit these changes as usage information. That is, the monitoring agent is configured to track the changes made by a user to a configuration after a copy of the master OS image is deployed onto a client system.

The image deployment monitor (299) is configured to use the usage information received from the monitored deployed copies to detect a change in one or more configurations of a first set of deployed copies of a plurality of monitored deployed copies. In a particular embodiment, the image deployment monitor examines the received usage information to find a common change made by users of the deployed copies. If the image deployment monitor identifies a common change, the image deployment monitor (299) may be configured to generate a configuration recommendation recommending the change to other OS images, such as the master OS image (256) and other concurrently deployed copies of the master OS image. To identify which concurrently deployed copies to send a configuration recommendation, the image deployment monitor (299) examines the usage information to identify which concurrently deployed copies have not implemented the identified change to their configurations. After identifying the concurrently deployed copies that have not implemented the identified change, the image deployment monitor (299) may send to those concurrently deployed copies, a configuration recommendation recommending the change. In a particular embodiment, the image deployment monitor is also configured to send to the master OS image, a configuration recommendation recommending the change.

In the example of FIG. 2, each OS image includes an adjustment module for implementing changes recommended in a received configuration recommendation. For example, the first deployed copy (250) includes a first adjustment module (270), the second deployed copy (252) includes a second adjustment module (272), the third deployed copy includes a third adjustment module (274), and the master OS image (256) includes a master adjustment module (276). Each adjustment module, in response to receiving a configuration recommendation from the image deployment monitor (299) may examine the configuration recommendation to determine an action to implement the change to their configurations. Configuration recommendations generated by the image deployment monitor (299) may specify an action designed to facilitate a configuration change on concurrently deployed copies and future deployed copies of a master OS image. Adjustment modules on concurrently deployed copies may immediately apply the specified action. An adjustment module in a master OS image, however, may use special instructions to modify a default configuration or may use deployment policies to make sure that future deployed copies implement the change.

For example, during operation, the first usage information (230) and the second usage information (232) may indicate that after deployment of copies (250, 252) of the master OS image (256) onto the client systems (240, 242), users installed a virtual networking computing (VNC) server on each client system. Based on the usage information, the image deployment monitor (299) may also conclude that the third deployed copy has not implemented the change to its configuration (284). Accordingly, the image deployment monitor (299) may generate and provide to the third deployed copy (254), a configuration recommendation (234) recommending the installation of a VNC server. In response to receiving the first configuration recommendation (234), the third deployed copy (254) may use its adjustment module (274) to change its configuration (284) by installing a VNC server.

The image deployment monitor (299) may also generate and provide to the master OS image (256), a second configuration recommendation (236) recommending the installation of a VNC server. In response to receiving the second configuration recommendation (236), the master OS image (256) may use its adjustment module (276) to change its default configuration (286) that is deployed with future copies of the master OS image (256).

Figure 3:
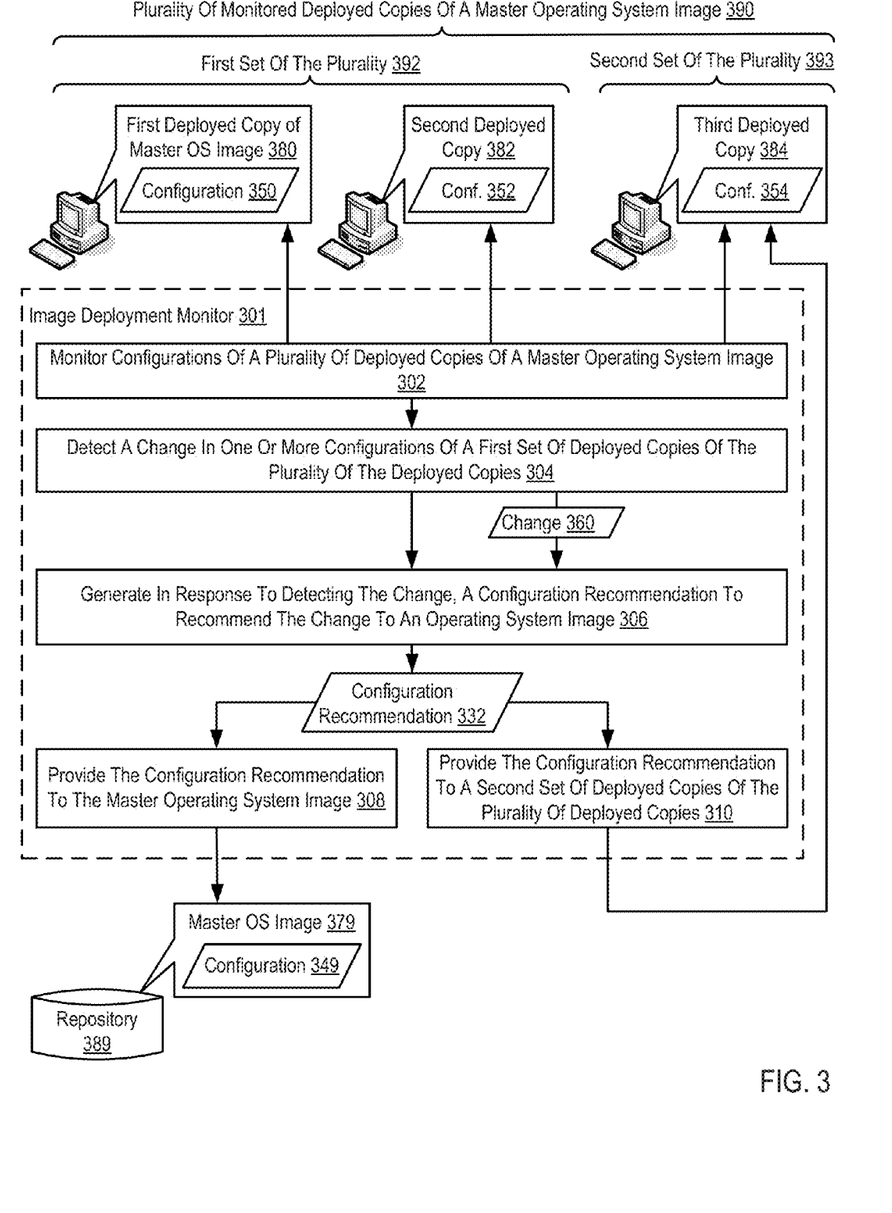
FIG. 3 sets forth a flow chart illustrating an exemplary method for dynamically recommending configuration changes to an operating system image according to embodiments of the present invention.

For further explanation, FIG. 3 sets forth a flow chart illustrating an exemplary method for dynamically recommending configuration changes to an operating system image according to embodiments of the present invention. The method of FIG. 3 includes monitoring (302), by an image deployment monitor (301), configurations (350, 352, 354) of a plurality (390) of deployed copies (380, 382, 384) of a master operating system (OS) image (379). Monitoring (302) configurations (350, 352, 354) of a plurality (390) of deployed copies (380, 382, 384) of a master OS image (379) may be carried out by installing a monitoring agent on each deployed copy and receiving usage information from each monitoring agent. A monitoring agent may be configured to monitor data metrics associated with the deployed copy, such as specific applications installed on a system and preferences related to those applications and transmit those changes as usage information. Usage information is data indicating changes that a user makes to a default configuration after a copy is deployed on a client system. An example of usage information includes indications of software modules installed after deployment and that were not part of the default configuration. User preferences associated with the deployed copy may also be indicated in usage information. That is, the image deployment monitor may act as a management hub for collecting and reporting on the data metrics gathered by the monitoring agents.

The method of FIG. 3 includes detecting (304), by the image deployment monitor (301), a change (360) in one or more configurations (350, 352) of a first set (392) of deployed copies (380, 382) of the plurality (390) of deployed copies (380, 382, 384). Detecting (304), by the image deployment monitor (301), a change (360) in one or more configurations (350, 352) of a first set (392) of deployed copies (380, 382) of the plurality (390) of deployed copies (380, 382, 384) may be carried out by examining received usage information from each of the monitored deployed copies and identifying a common configuration change. For example, if eight out of ten monitored deployed copies have installed a virtual network (VNC) server, the image deployment monitor (301) may detect the installation of a VNC server as a change.

The method of FIG. 3 includes generating (306) in response to detecting the change, by the image deployment monitor (301), a configuration recommendation (332) to recommend the change to an OS image. Generating (306) in response to detecting the change, a configuration recommendation (332) to recommend the change to an OS image may be carried out by identifying an action that can be used to facilitate the change in another OS image, such as a master OS image or a deployed copy of a master OS image, and indicating the action in the configuration recommendation.

The method of FIG. 3 may also include providing (308), by the image deployment monitor (301), the configuration recommendation (332) to the master OS image (379). As explained above, a configuration recommendation is designed to recommend a particular change to an OS image. To accomplish this task, a configuration recommendation may include different types of data. For example, if the configuration recommendation is designed to recommend installation of a particular software component, the configuration recommendation may include data specifying attributes of offending software modules, such as version number, author, and distribution number. Providing (308), by the image deployment monitor (301), the configuration recommendation (332) to the master OS image (379) may be carried out by using direct or indirect communication to communicate with the master OS image (379) at a repository (389).

The method of FIG. 3 may also include providing (310), by the image deployment monitor (301), the configuration recommendation (332) to the one or more other deployed copies (394) of the master OS image (395). Providing (310), by the image deployment monitor (301), the configuration recommendation (332) to the one or more other deployed copies (394) of the master OS image (395) may be carried out by identifying which deployed copies have not implemented the change; and sending the configuration recommendation to those deployed copies. For example, if eight out of ten deployed copies have installed a VNC server, the image deployment monitor may provide to the other two deployed copies, a configuration recommendation recommending installation of a VNC server.

Exemplary embodiments of the present invention are described largely in the context of a fully functional computer system for dynamically recommending configuration changes to an operating system image. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamically recommending configuration changes to an operating system image, the method comprising:
    monitoring, by a processor of a computing device, configurations of a plurality of deployed copies of a master operating system (OS) image on a plurality of client systems, wherein monitoring configurations of the plurality of deployed copies of the master OS image comprises:
        installing a monitoring agent on each deployed copy of the master OS on each client system to detect and collect usage information on each client system, and transmit the usage information to the image deployment monitor, and
        receiving, from each monitoring agent, the usage information indicating changes that one or more users have made to the configurations of the plurality of the deployed copies of the master OS image on the plurality of client systems;
    detecting, by the processor of the computing device, a changes in one or more configurations of a first set of deployed copies of the plurality of deployed copies, including examining the received usage information to identify common changes made by users in one or more configurations of the first set of deployed copies, determining that at least a predetermined threshold of the deployed copies of the master OS image installed a particular application after being deployed, and generating a configuration recommendation based on the common changes of the one or more configurations to the installed particular application;
    identifying, by the processor of the computing device, a second set of deployed copies that have not installed the particular application after being deployed, the second set of deployed copies that have not installed the particular application after being deployed consists of all of the deployed copies in the plurality of deployed copies that have not installed the particular application after being deployed; and
    transmitting, by the processor of the computing device, to the identified second set of deployed copies that have not installed the particular application after being deployed, the generated configuration recommendation that recommends installation of the particular application on each client system hosting the second set of deployed copies.

2. The method of claim 1 further comprising providing, by the processor of the computing device, the configuration recommendation to the master OS image.

3. The method of claim 2 wherein the master OS image includes an adjustment module configured to modify future deployed copies of the master OS image based on the configuration recommendation.

4. The method of claim 1 wherein each of the deployed copies in the second set includes an adjustment module configured to modify a configuration of a deployed copy based on the configuration recommendation.

5. The method of claim 1 wherein the change includes installation of a software module; and wherein the configuration recommendation recommends installing the software module.

* * * * *